United States Patent [19]

Armitage

[11] Patent Number: 4,643,533
[45] Date of Patent: Feb. 17, 1987

[54] DIFFERENTIATING SPATIAL LIGHT MODULATOR

[75] Inventor: David Armitage, Los Altos, Calif.

[73] Assignee: The United States of America as represented by the Secretary of the Air Force, Washington, D.C.

[21] Appl. No.: 721,977

[22] Filed: Apr. 11, 1985

[51] Int. Cl.$^4$ .............................................. G01F 1/13
[52] U.S. Cl. ................................. 350/350 S; 350/354
[58] Field of Search .................... 350/350 S, 334, 336, 350/338, 350 R, 342, 354; 340/784

[56] References Cited

U.S. PATENT DOCUMENTS

| Re. 28,971 | 9/1976 | Kumada et al. | 350/150 |
|---|---|---|---|
| 3,304,428 | 2/1967 | Peters | 250/199 |
| 3,429,636 | 2/1969 | Wentz | 350/160 |
| 3,462,211 | 8/1969 | Nelson et al. | 350/150 |
| 3,572,898 | 3/1971 | Eaglesfield | 350/160 |
| 4,046,455 | 9/1977 | Kumada et al. | 350/150 |
| 4,518,226 | 5/1985 | Shionozaki | 350/350 S |
| 4,525,032 | 6/1985 | Hilsum | 350/350 S |

OTHER PUBLICATIONS

"Progress in the Development and Applications of Optically Controlled Liquid Crystal Spatial Light Modulators (review)", A. A. Vasil'ev et al., Sov. J. Quantum Electron, 13(6), Jun. 1983, pp. 689–695.

"A Fast Silicon Photoconductor-Based Liquid Crystal Light Valve", P. O. Braatz, K. Chow, U. Efron, J. Grinberg and M. J. Little, IEEE International Electron Devices Meeting, pp. 540–543, 1979.

"Obliqud-Cut LiNbO$_3$ Microchannel Spatial Light Modulator" C. Warde and J. I. Thakara, Optics Letters, vol. 7, No. 7, Jul. 1982.

"A First-Order Model of a Photo-Activated Liquid Crystal Light Valve", J. D. Michaelson, SPIE vol. 218, Devices and Systems for Optical Signal Processing, 1980.

"LiNbO$_3$ and LiTaO$_3$ Microchannel Spatial Light Modulators", C. Warde, A. M. Weiss and A. D. Fisher, SPIE vol. 218, Devices and Systems for Optical Signal Processing, 1980.

"Silicon Liquid Crystal Light Valves: Status and Issues", U. Efron, P. O. Braatz, M. J. Little, R. N. Schwartz and J. Grinberg, Proc. SPIE vol. 388, Jan. 1983.

"Applications of Priz Light Modulator", D. Casasent, F. Caimi, M. Petron and A. Khomenko, Applied Optics, vol. 21, No. 21, Nov. 1982, pp. 3846–3854.

PLZT Color Displays, G. Haertling, SID 84 Digest, pp. 137–140.

"High-Speed High-Resolution Coherent Optical Modulator", W. Anderson, D. Armitage and T. J. Karr, Technical Digest, Conference on Lasers and Electro-Optics, May 17–20, 1983.

"Rapid Turn-Off in Triode Optical Gate Liquid Crystal Devices", D. J. Channin and D. E. Carlson, Applied Physics Letters, vol. 28, No. 6, Mar. 15, 1976, pp. 300–302.

"Triode Optical Gate: A New Liquid Crystal Electro-Optic Device", D. J. Channin, Applied Physics Letters, vol. 26, No. 11, Jun. 1, 1975, pp. 603–605.

Primary Examiner—Arthur G. Evans
Attorney, Agent, or Firm—Richard J. Donahue; Donald J. Singer

[57] ABSTRACT

A differentiating spatial light modulator device in which a photoreceptor and an electro-optic crystal are isolated by a dielectric mirror. The electro-optic crystal is configured to have low or zero longitudinal response, yet is sensitive to transverse electric fields. The fringe field generated by the photoreceptor (photodiode) modultes the crystal birefringence. Readout via a polarizing beamsplitter gives an output light related to the spatial gradient of the input light. In a liquid crystal embodiment of the invention, reversal of the applied voltage gives a driven off state which speeds the erasure. Storage is possible in the smectic liquid crystal phase.

7 Claims, 2 Drawing Figures

DIFFERENTIATING SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of optical signal processing apparatus, and more specifically to a differentiating spatial light modulator of simplified construction and improved performance.

Two-dimensional spatial light modulators are devices which allow control of an optical wavefront for processing or imaging operations. These devices, often referred to as light valves in the literature, have potential for application in large screen display systems as well as in optical data processing systems, including missile guidance and robotic vision systems. Listed below are several articles which describe their construction and operation.

1. "A Fast Silicon Photoconductor-Based Liquid Crystal Light Value", P. O. Braatz, K. Chow, U. Efron, J. Grinberg and M. J. Little, IEEE International Electron Devices Meeting, pp. 540–543, 1979.

2. "Oblique-cut $LiN_bO_3$ Microchannel Spatial Light Modulator", C. Warde and J. I. Thakara, Optics Letters, Vol. 7, No. 7, July 1982.

3. "A First-Order Model of a Photo-Activated Liquid Crystal Light Valve", J. D. Michaelson, SPIE Vol. 218, Devices and Systems For Optical Signal Processing, 1980.

4. "$LiNbO_3$ and $LiTaO_3$ Microchannel Spatial Light Modulators", C. Warde, A. M. Weiss and A. D. Fisher, SPIE Vol 218, Devices and Systems for Optical Signal Processing, 1980.

5. "Silicon Liquid Crystal Light Valves: Status and Issues", U. Efron, P. O. Braatz, M. J. Little, R. N. Schwartz and J. Grinberg, Proc. SPIE Vol. 388, Jan. 1983.

6. "Applications of Priz Light Modulator", D. Casasent, F. Caimi, M. Petron and A. Khomenko, Applied Optics, Vol. 21., No. 21, November 1982, pp. 3846–3854.

7. PLZT Color Displays, G. Haertling, SID 84 Digest, pp. 137–140.

Spatial light modulators often comprise a photosensitive semiconductor substrate (photodiode), a light blocking layer, a dielectric mirror and an electro-optic crystal (which may be a liquid crystal), arranged in a sandwich-like composite structure, and having a voltage applied thereacross. A control (write) illumination impinges on the face of the photosensitive semiconductor while an output (read) illumination makes a double pass through the electro-optic crystal.

The photosensitive semiconductor responds to intensity variations in the control illumination impinging thereon. In the dark, most of the voltage applied across the composite structure appears across the reverse-biased photodiode. The write beam, however, excites carriers in the silicon, which are driven by the internal field to the Si/electro-optic crystal interface. The voltage across the silicon decreases, while the voltage across the electro-optic crystal increases. The read illumination passes through the electro-optic crystal, is reflected off of the dielectric mirror, and again passes through the electro-optic crystal before emerging from the device. Since the diffraction efficiency of the electro-optic crystal is a function of the voltage applied thereacross, (which is a function of the intensity of the write illumination), optical control of the output (read) illumination is achieved.

It is known that in the recognition of images, about ninety percent of the information content resides at the edges of the image, where abrupt changes in light intensity occur. A form of spatial light modulator called the Priz modulator has been designed which modulates light by the transverse (rather than the longitudinal) electro-optic effect. Thus, only the edge contour of an object appears and edge enhancement is achieved.

The operation of the Priz spatial light modulator involves the use of a BSO (bismuth silicon oxide, $Bi_{12}Si\,O_{20}$) crystal which is cut such that the device modulates light by the transverse rather than the longitudinal electro-optic effect. The spatially varying light distribution is still incident on the crystal's large faces collinear with the applied electric field direction, and the spatially varying charge layer parallel to the crystal's large faces is still induced. However, the transverse component of this field is what is used to provide the spatial modulation of the incident light.

In the Priz spatial light modulator, the photoconductor and electro-optic crystal are one and the same BSO element. This can have the disadvantage of erasure of the image by the readout light. Alternatively, cyclic operation requires an optical erasure operation which removes the previously recorded image. Moreover, the BSO crystal has a somewhat limited wavelength range of operation.

OBJECTS AND SUMMARY OF THE INVENTION

It is therefore the general object of the present invention to provide an improved differentiating spatial light modulator.

It is a further object of the present invention to provide a novel and cost effective means for eliminating readout erasure and increasing wavelength range in differentiating spatial light modulators.

It is an additional object of the present invention to provide a differentiating spatial light modulator utilizing a liquid crystal as the electro-optic crystal in one embodiment thereof, and in which the cycle time of the device is substantially reduced.

Briefly, in the spatial light modulator device of the present invention, a photoreceptor and an electro-optic crystal are isolated by a dielectric mirror. The electro-optic crystal is configured to have low or zero longitudinal response, yet is sensitive to transverse electric fields. The fringe field generated by the photoreceptor (photodiode) modulates the crystal birefringence. Readout via a polarizing beamsplitter gives an output light related to the spatial gradient of the input light. In a liquid crystal embodiment of the invention, reversal of the applied voltage gives a driven off state which speeds the erasure. Storage is possible in the smectic liquid crystal phase.

BRIEF DESCRIPTION OF THE DRAWINGS

The aforementioned and other objects and many attendant advantages of the invention will become more apparent upon a reading of the following detailed description together with the drawings, in which like reference numerals refer to like parts throughout.

DETAILED DESCRIPTION OF THE INVENTION

Figure 1:
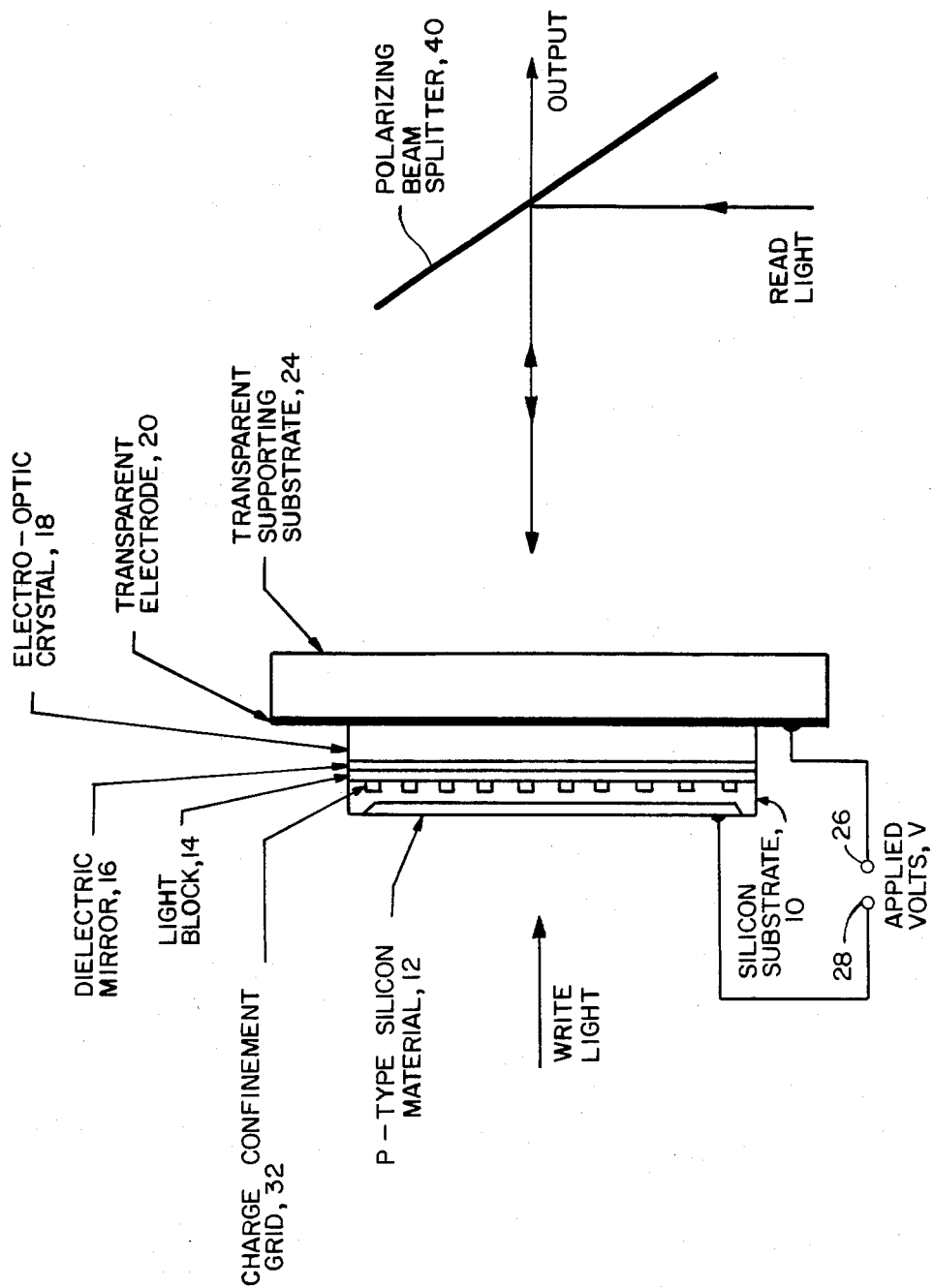
FIG. 1 is a diagram of a spatial light modulator constructed in accordance with one embodiment of the invention.

FIG. 1 is a diagram depicting the side view of a preferred embodiment of the spatial light modulator of the present invention which utilizes a solid electro-optic crystal. The various components thereof have not been drawn to scale in view of the large differences in their thicknesses. Representative thickness values are provided herein however, to facilitate an understanding of the invention.

The modulator has a substrate 10 formed of silicon material having a thickness in the order of 100 microns. A p-type silicon material 12 of approximately 0.1 microns is diffused in the exposed surface thereof to form a silicon photodiode. A charge confinement grid 32 is formed on the inner surface of silicon substrate 10 to prevent lateral charge transfer in the semiconductor device. The grid 32 may be a boron-implanted p-grid, as taught by P. O. Braatz et al in the article entitled "A Fast Silicon Photoconductor-Based Liquid Crystal Light Valve", or may be a microgroove lattice structure, as taught by the present inventor in his patent application Ser. No. 689,699 filed Jan. 8, 1985 and entitled "Charge Isolation In A Spatial Light Modulator".

The inner surface of silicon substrate 10 is adjacent a layer of light blocking material 14, having a thickness in the order of one micron. In certain applications, this light blocking layer 14 may be unnecessary. Light blocking layer 14 is affixed to a dielectric mirror 16 and it, in turn is affixed to an electro-optic crystal 18 having a thickness in the order of 100 microns.

As mentioned above, the light blocking layer may be omitted. The dielectric mirror transmits about 0.1% of the read illumination to the silicon substrate 10. In some applications this is not critical. If required, further isolation is provided by an absorbing or light blocking layer 14 having a thickness less than 10 microns to avoid degrading the resolution of the device. The conductivity of the layer must be low to avoid charge confinement leakage.

Electro-optic crystal 18 is affixed to a transparent electrode 20 having a thickness of approximately 0.25 microns and formed on one surface of a transparent supporting substrate 24 having a thickness in the order of 15 millimeters. Transparent electrode 20 provides a uniform initial electric field across electro-optic crystal 18. A first electrical terminal 26 is connected to the transparent electrode 20 and a second electrical terminal 28 is connected to the p-type material 12 diffused in silicon substrate 10. A voltage V is applied across the terminals 26 and 28.

Optical quality and voltage requirements, as well as the required sensitivity to a transverse electric field, suggest that electro-optic crystal 18 be formed of z-cut lithium tantalate (LT), or Lead Zirconate-Lead Titanate (PLZT). The transparent supporting substrate 24 may be formed of glass or calcuim fluoride.

The operation of the spatial light modulator shown in FIG. 1 is similar to that disclosed earlier. The control illumination, which could in some applications be the image of an object or scene of interest excites electrons and holes in the silicon photodiode formed in silicon substrate 10. Electrons are driven by the internal electric field in the diode to the silicon substrate 10/electro-optic crystal 18 interface. (Since the light blocking layer 14 and dielectric mirror 16 are thin and of high resistivity, they can be ignored in this analysis.) This surface charge pattern in the silicon substrate 10 gives rise to a transversely varying voltage pattern containing the same information as the charge pattern. The transverse fringe field associated with the voltage pattern modulates the birefringence of the electro-optic crystal 18. The birefringence variations are sensed with the read beam via a polarizing beam splitter 40, to give an output which is the spatial gradient of the input light.

The dielectric mirror 16 is necessary for the read operation and prevents the read beam from destroying the charge pattern at the surface of silicon substrate 10 by creating more charge carriers in the silicon. The light-blocking layer 14, if used, attenuates any read beam leakage through the dielectric mirror 16. The transparent electrode 20 in conjunction with the applied voltage V, provides a uniform initial field across the electro-optic crystal 18. When the read operation has been completed, the voltage V may be removed from across the terminals 26 and 28, and the transversely varied charge pattern will discharge to equilibrium.

As previously noted, about ninety percent of the information content useful for image recognition is contained in the edges of the image, where sudden changes of intensity level occur. This information is amplified and extracted directly by the differentiating spatial light modulator of the present invention, which differs from prior art devices by employing an electro-optic crystal having a low or zero response to a longitudinal electric field (direction of light propagation), yet a pronounced sensitivity to a transverse electric field. A sudden spatial change of intensity in the input plane of the differentiating SLM device produces a large local transverse electric field component in the electro-optic crystal. The electro-optic crystal will have an induced birefringence response to the electric field. This changes the polarization state of the readout light such as to increase the optical transmission through a polarizing beam splitter. The induced birefringence will depend on the field direction and crystal symmetry. For any solid crystal 18 there will be a direction of transverse field which has zero birefringence effect, e.g. for LT, the y direction. This means that the edge brightness is determined by edge orientation. This can be used to advantage in image recognition schemes.

Figure 2:
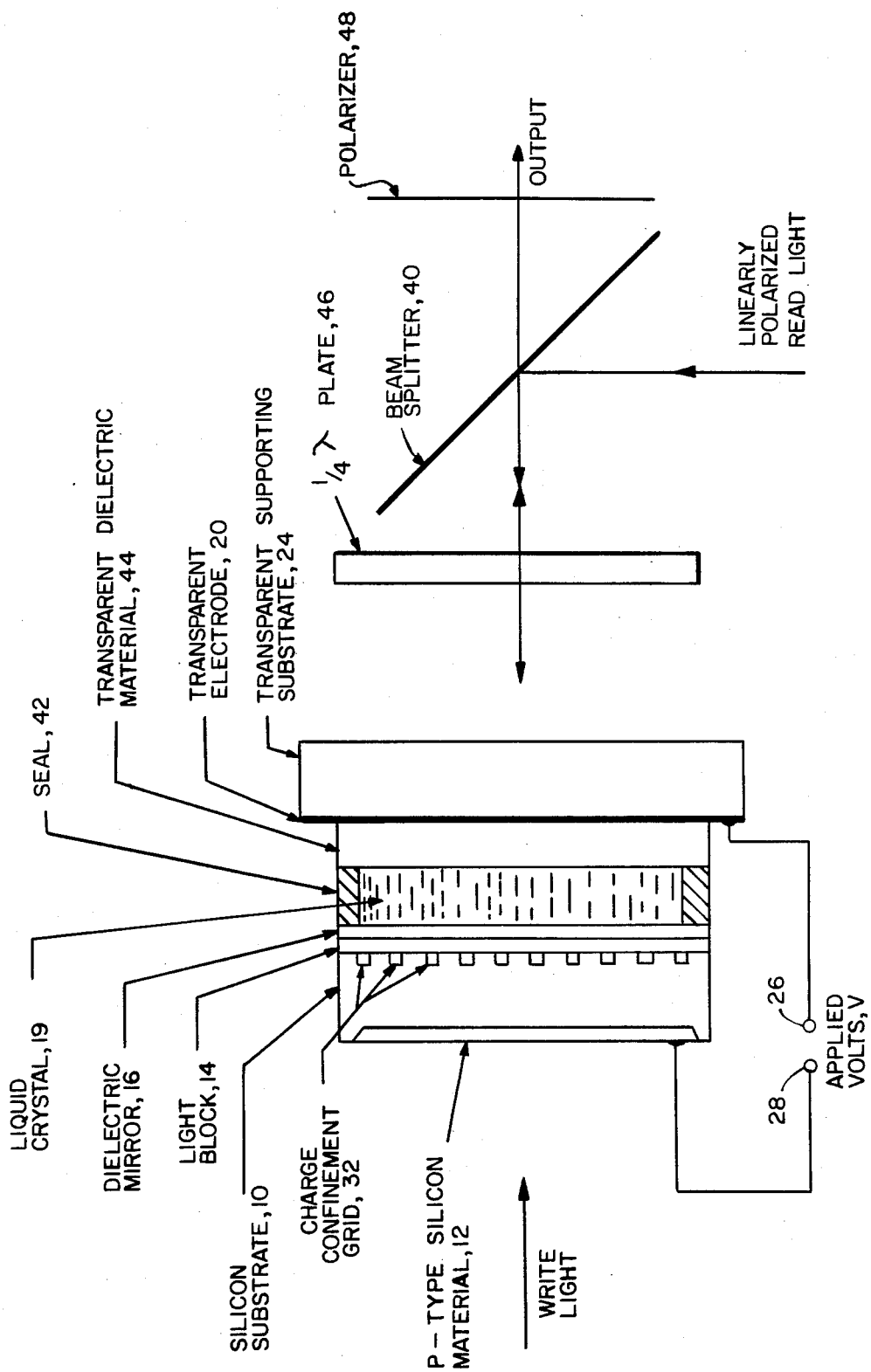
FIG. 2 is a diagram of a spatial light modulator in which the electro-optic crystal is a liquid crystal device.

In the liquid crystal embodiment of the present invention, a slightly different structure is required as shown in FIG. 2. The dielectric mirror 16 is adjacent a glass substrate 44 and spaced approximately 10 microns therefrom by sealing members 42. The space therebetween is filled with liquid crystal 19. The dielectric material 44 (glass) approximately 10 microns thick between the electrode 20 and liquid crystal 19 eliminates the least effective region of the liquid crystal 19. This is advantageous since the liquid is turbid. The surfaces in contact with the liquid crystal are treated with a perpendicular aligning agent, e.g. octadecyltrichlorosilane.

When the electro-optic crystal is a perpendicularly aligned liquid crystal 19, there is always a birefringent effect as the optic axis is tilted away from perpendicular by the transverse electric field. Linearly polarized readout, as before, will relate line brightness to line orientation. If this is undesireable it can be avoided by using circularly polarized read light by insertion of a ¼ wave retarder 46 as shown. The line brightness is now independent of orientation.

Existing nematic liquid crystal devices are electrically driven in one direction and rely on elastic restoring forces to return to the initial state. This restricts the cycle time of the device. Two frequency addressing has had limited success in achieving driven on and off states. In the device described in FIG. 2, the off state is an undistorted perpendicular aligned nematic. This can be driven by reversing the polarity of the drive voltage which forward biases the photodiode, producing a uniform voltage across the nematic liquid crystal. The direction of the field is such as to produce the required off state alignment.

If the liquid crystal is smectic-A phase, then memory is possible. The write and erase processes that have been described are applicable. If the voltage source is removed after the write pulse, then the written image will be stored for an indefinite time until erased.

A differentiating SLM as described herein will also function in off-axis holography, since this is associated with carrier spatial frequency. The carrier spatial frequency provides a transverse electric field component. (In off-axis holography the image wavefront is added to a plane reference wave. Therefore, even when the image is a uniform plane wave, a sinusoidal interference pattern is generated at the SLM output.)

Prior art devices which are based on photorefractive material, such as bismuth silicon oxide and where the photoconductor and electro-optic crystal are one and the same material can have the disadvantage of erasure by the readout light. Alternatively, cyclic operation requires an optical erasure operation which removes the previously recorded image. These limitations are eliminated in the present invention. Also a wider choice of materials is possible with the present invention.

Although the invention has been described with reference to a particular embodiment, it will be understood to those skilled in the art that the invention is capable of a variety of alternative embodiments within the spirit and scope of the appended claims.

What is claimed is:

1. A spatial light modulator which comprises:
   a silicon substrate having a first surface and an opposed second surface, said substrate having p-type silicon material diffused in said first surface thereof to form a photodiode and a charge confinement grid formed in said second surface thereof to prevent lateral charge transfer;
   a dielectric mirror having a first surface and an opposed second surface, the first surface of said mirror being adjacent said second surface of said silicon substrate;
   a transverse electro-optic crystal having a first surface and an opposed second surface, the first surface thereof being adjacent the second surface of said dielectric mirror, said transverse electro-optic crystal having substantially no response to longitudinally applied electric fields and having a substantial response to transversely applied electric fields;
   a transparent electrode having a first surface and an opposed second surface, the first surface thereof being adjacent the second surface of said electro-optic crystal;
   a transparent supporting substrate having a first surface and an opposed second surface, the first surface thereof being adjacent the second surface of said transparent electrode; and,
   means for applying a voltage between said p-type material and said transparent electrode.

2. A spatial light modulator as defined in claim 1 wherein said electro-optic crystal is a solid material.

3. A spatial light modulator as defined in claim 2 wherein said electro-optic crystal is z-cut lithium tantalate material.

4. A spatial light modulator as defined in claim 2 wherein said electro-optic crystal is lead zirconate-lead titanate material.

5. A spatial light modulator as defined in claim 1 wherein said electro-optic crystal is a perpendicularly-aligned nematic liquid crystal which is deflected by a transverse electric field and which is realigned by a longitudinal electric field.

6. A spatial light modulator as defined in claim 1 wherein said electro-optic crystal is a perpendicularly-aligned smectic-A liquid crystal which is deflected by a transverse electric field into a focal conic texture configuration and remains in said configuration when said transverse electric field is removed.

7. A spatial light modulator as defined in claim 6 wherein said focal conic texture configuration is removed from said liquid crystal by a longitudinal electric field.

* * * * *